(12) United States Patent
Walter

(10) Patent No.: US 8,903,244 B2
(45) Date of Patent: Dec. 2, 2014

(54) MODULAR NETWORK TERMINALS AND METHODS TO USE THE SAME

(75) Inventor: Edward Walter, Boerne, TX (US)

(73) Assignee: AT&T Intellectual Property I., L.P., Atlanta, GA (US)

( * ) Notice: Subject to any disclaimer, the term of this patent is extended or adjusted under 35 U.S.C. 154(b) by 1141 days.

(21) Appl. No.: 12/339,713

(22) Filed: Dec. 19, 2008

(65) Prior Publication Data

US 2010/0158525 A1     Jun. 24, 2010

(51) Int. Cl.
| H04J 14/00 | (2006.01) |
|---|---|
| H04B 10/00 | (2013.01) |
| H04Q 11/00 | (2006.01) |
| H04L 12/28 | (2006.01) |
| H04L 12/24 | (2006.01) |

(52) U.S. Cl.
CPC ....... *H04Q 11/0067* (2013.01); *H04Q 11/0071* (2013.01); *H04L 12/2898* (2013.01); *H04L 41/5054* (2013.01); *H04L 41/509* (2013.01); *H04L 41/5087* (2013.01)
USPC ............. 398/116; 398/66; 398/115; 398/117; 398/153; 398/168

(58) Field of Classification Search
USPC .................................................. 398/66, 168
See application file for complete search history.

(56) References Cited

U.S. PATENT DOCUMENTS

| 5,553,071 | A | 9/1996 | Aranguren et al. | |
|---|---|---|---|---|
| 6,785,265 | B2 | 8/2004 | White et al. | |
| 7,385,995 | B2 | 6/2008 | Stiscia et al. | |
| 2002/0151302 | A1* | 10/2002 | Schmidt et al. | 455/426 |
| 2003/0226149 | A1 | 12/2003 | Chun et al. | |
| 2004/0105467 | A1 | 6/2004 | Goodman | |
| 2004/0136534 | A1 | 7/2004 | Stiscia et al. | |
| 2004/0136712 | A1 | 7/2004 | Stiscia et al. | |
| 2004/0141759 | A1* | 7/2004 | Stiscia et al. | 398/168 |
| 2004/0172652 | A1 | 9/2004 | Fisk et al. | |
| 2005/0226170 | A1 | 10/2005 | Relan et al. | |
| 2006/0020960 | A1 | 1/2006 | Relan et al. | |
| 2006/0067705 | A1* | 3/2006 | Paulsen | 398/164 |
| 2007/0140691 | A1 | 6/2007 | Gao et al. | |
| 2007/0195823 | A1 | 8/2007 | Biegert | |
| 2007/0201872 | A1 | 8/2007 | Yim et al. | |
| 2008/0013909 | A1 | 1/2008 | Kostet et al. | |
| 2008/0022341 | A1 | 1/2008 | Walter et al. | |
| 2008/0031451 | A1* | 2/2008 | Poirier | 380/228 |

(Continued)

OTHER PUBLICATIONS

Tii Outrigger Media Access Portal (MAP). Datasheet [online]. tii Network Technologies, Inc., 2008 [retrieved on Sep. 23, 2008]. Retrieved from the Internet: <URL: http://www.tiinettech.com/tii_products.php?CategoryID=12>.

(Continued)

*Primary Examiner* — Darren E Wolf
(74) *Attorney, Agent, or Firm* — Hanley, Flight & Zimmerman, LLC

(57) ABSTRACT

Example modular optical network terminals (ONTs) and methods to implement the same are disclosed. A disclosed example ONT includes a base unit having an integral optical interface to optically couple the ONT to an optical network, and to convert an optical signal received from the optical network to form an electrical signal, a plug-in service module to distribute the electrical signal within a customer premises, and a modular interface connector configured to receive the plug-in service module and to couple the electrical signal from the base unit to the plug-in service module.

17 Claims, 6 Drawing Sheets

FIG. 1

(56) References Cited

U.S. PATENT DOCUMENTS

| | | | |
|---|---|---|---|
| 2008/0109838 A1 | 5/2008 | Zureczki et al. | |
| 2008/0193128 A1 | 8/2008 | Hu et al. | |
| 2008/0263056 A1 | 10/2008 | Murray et al. | |
| 2008/0263604 A1 | 10/2008 | Murray et al. | |
| 2009/0041467 A1* | 2/2009 | Carleton et al. | 398/135 |

OTHER PUBLICATIONS

Outrigger Media Access Portal. Brochure [online]. tii Network Technologies, Inc., 2008 [retrieved on Sep. 23, 2008]. Retrieved from the Internet: <URL: http://www.tiinettech.com/images/pdf/Outrigger.pdf>.

ZNID GPON Network Interface Device (NID). Datasheet [online]. Zhone Technologies, Inc. [retrieved on Sep. 23, 2008]. Retrieved from the Internet: <URL: http://www.zhone.com/products/ZNID-GPON/ZNID-GPON.pdf>.

The Convergence of GPON and the Connected Home. Application Note [online]. Zhone Technologies, Inc. [retrieved on Sep. 23, 2008]. Retrieved from the Internet: <URL: http://www.zhone.com/solutions/docs/zti-an-gpon-sol.pdf>.

* cited by examiner

MODULAR NETWORK TERMINALS AND METHODS TO USE THE SAME

FIELD OF THE DISCLOSURE

This disclosure relates generally to telecommunication services and, more particularly, modular network terminals to provide telecommunication services and methods to use the same.

BACKGROUND

Increasing numbers of customer premises have access to high-speed and/or broadband Internet connectivity. Such broadband connectivity can be used to enable the delivery of a wide range of services including, for example, "triple-play" services that include voice, data and television. In some instances, a network terminal, such as an optical network terminal (ONT), is installed at a customer premises to communicatively couple the customer premises to a service provider network via a single high-speed communication link. The network terminal receives data associated with a plurality of services and/or communication sessions via the communication link, and distributes the data among and/or to a plurality of interfaces that are accessible to and/or useable by persons at the customer premises. Likewise, the network terminal receives data associated with the plurality of services and/or communication sessions via the user accessible interfaces, and combines them together for transport to the service provider network via the high-speed communication link. Example technologies that may be used to implement the high-speed communication link include, but are not limited to, fiber optic technologies, coaxial cable technologies, and digital subscriber line (DSL) technologies.

DETAILED DESCRIPTION

Figure 1:
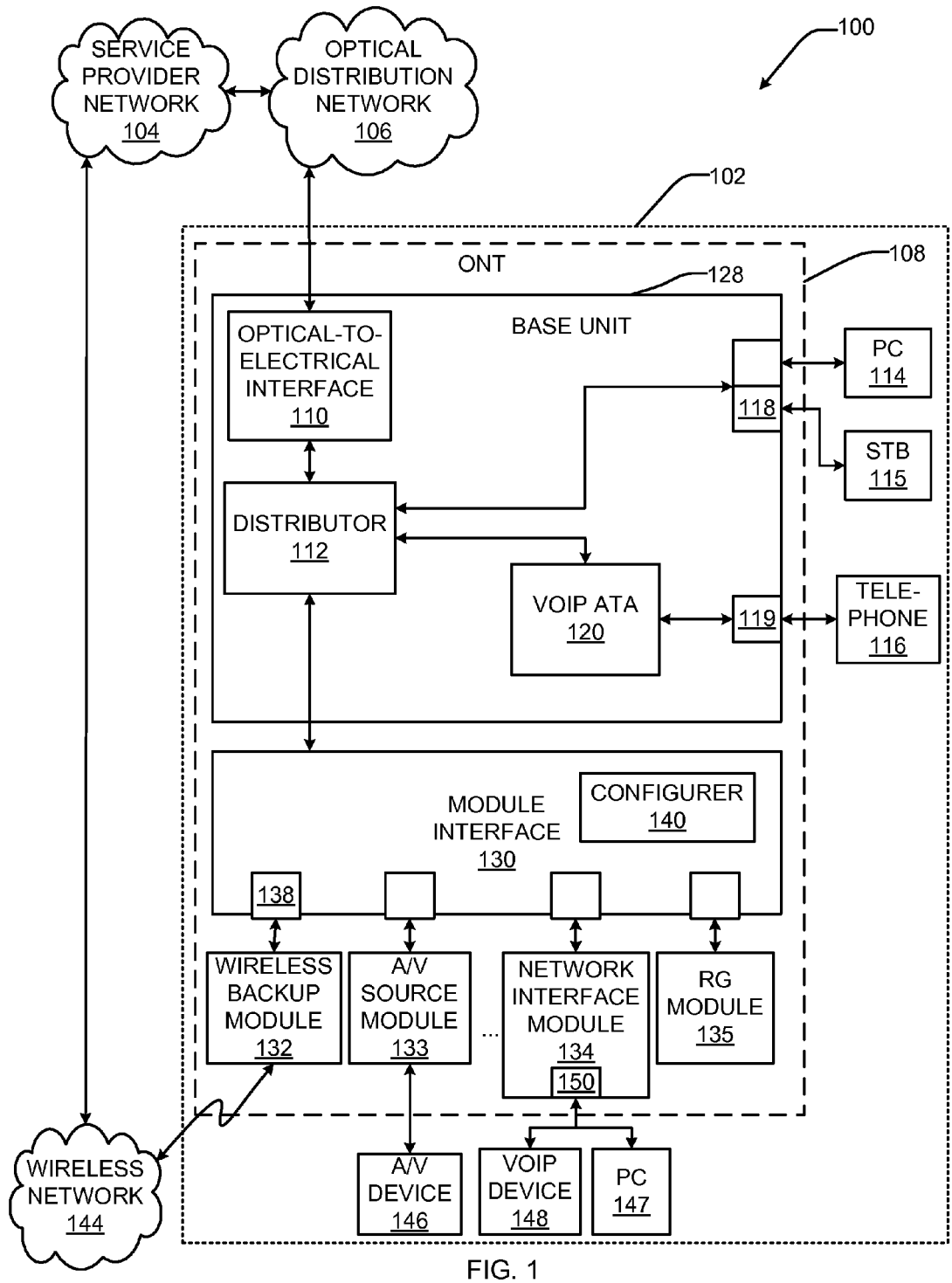
FIG. 1 illustrates an example modular ONT constructed in accordance with the teachings of this disclosure.

Example modular network terminals and methods to use the same are disclosed. A disclosed example optical network terminal (ONT) includes a base unit having an integral optical interface to optically couple the ONT to an optical network, and to convert an optical signal received from the optical network to form an electrical signal, a plug-in service module to distribute the electrical signal within a customer premises, and a modular interface connector configured to receive the plug-in service module and to couple the electrical signal from the base unit to the plug-in service module.

A disclosed example method includes receiving data at an ONT from an optical distribution network, identifying a service associated with the data that is not associated within an interface that is integral to the ONT, determining whether a plug-in service module associated with the identified service is installed in an expansion port of the ONT, and routing data between the base unit of the ONT and the plug-in service module via the expansion port to provide the identified service to a customer premises associated with the ONT.

Another disclosed method includes determining whether an ONT at a customer premises is communicatively coupled to a service provider network via an optical distribution network, and when the ONT is not coupled to the service provider network via the optical distribution network, coupling the ONT to the service provider network via a wireless network to receive data from the service provider network.

Certain examples are shown in the above-identified figures and described in detail below. In describing these examples, like or identical reference numbers are used to identify common or similar elements. Although the example systems and apparatus described herein include, among other components, software executed on hardware, such systems and apparatus are merely illustrative and should not be considered as limiting. Any or all of the disclosed components could be embodied exclusively in hardware, exclusively in software, exclusively in firmware or in some combination of hardware, firmware, or software.

In the interest of brevity and clarity, throughout the following disclosure references will be made to an example communication system 100 and/or an example modular ONT 108 of FIG. 1. However, the methods and apparatus described herein to implement modular network terminals are applicable to other types of access networks and/or communication systems constructed using other network technologies, topologies, and/or protocols, such as digital subscriber line (DSL) technologies, wireless technologies, and/or cable modem technologies. Other example systems include, but are not limited to, those associated with public switched telephone network (PSTN) systems, public land mobile network (PLMN) systems (e.g., cellular), wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, power-line broadcast systems, and/or any combination and/or hybrid of these devices, systems and/or networks.

FIG. 1 illustrates the example communication system 100. To provide and/or implement any number and/or type(s) of communication and/or data services to and/or for any number and/or type(s) of customer premises, one of which is designated at reference numeral 102, the example communication system 100 of FIG. 1 includes a service provider network 104. Example services that may be provided by the example service provider network 104 of FIG. 1 include, but are not limited to, telephone services, Internet services, data services, messaging services, instant messaging services, electronic mail (email) services, chat services, video services, audio services, gaming services, etc. Such services are provided and/or implemented for the customer premises 102 by and/or via any number and/or type(s) of public and/or private network(s), such as the Internet, a content provider network, and/or a voice over Internet Protocol (VoIP) network (not shown).

To communicatively couple the example service provider network 104 to the example customer premises 102, the example communication system 100 of FIG. 1 includes any number and/or type(s) of optical distribution networks, one of which is designated at reference numeral 106. Example optical distribution networks 106 include, but are not limited to, a passive optical network (PON), an Ethernet-based PON (EPON) and/or a gigabit PON (GPON). Such optical distribution networks 106 may be implemented using, for example, a fiber to the premises (FTTP) topology and/or a fiber to the building (FTTB) topology, and may include any number and/or type(s) of optical cable(s), splitter(s), combiner(s), device(s) and/or add/drop multiplexer(s). In some examples, the example optical distribution network 106 includes an optical line terminal (OLT) to receive data from the example service provider network 104 and to distribute the data to the customer premises 102, and to receive data from the customer premises 102 and provide it to the service provider network 104.

To communicatively couple the example ONT 108 to the example optical distribution network 106, the example ONT 108 of FIG. 1 includes any number and/or type(s) of optical-to-electrical (O/E) interfaces, one of which is depicted at reference numeral 110. The example O/E interface 110 of FIG. 1 converts optical signals received via the optical distribution network 106 to electrical signals that may be distributed within the ONT 108 via any type of distributor 112. The example O/E interface 110 also converts electrical signals received from the example distributor 112 to optical signals that may be transmitted via the optical distribution network 106. The example O/E interface 110 of FIG. 1 may be implemented using any number and or type(s) of transceiver(s), receiver(s) and/or transmitter(s) implemented and/or designed, for example, for use in devices designed in accordance with any past, present or future standard, such as the Institute of Electrical and Electronics Engineers (IEEE) 802.3ah and 802.3av standards, and/or the International Telecommunications Union Telecommunications Standardization Sector (ITU-T) G.983.x and G.984.x families of standards.

The example distributor 112 of FIG. 1 communicatively couples and/or routes Ethernet packets between the example O/E interface 110 and any number and/or type(s) of devices communicatively coupled to the ONT 108, three of which are designated at reference numerals 114, 115 and 116. Example devices 114-116 include, but are not limited to, a personal computer (PC) 114 that may be used for Internet access, a set-top box (STB) 115 that may be used to provide an Internet protocol television (IPTV) service to a television, and a telephone 116 that may be used to access a telephone service, such as a VoIP service. The example distributor 112 of FIG. 1 may be implemented as a single device and/or as a combination of any number and/or type(s) of router(s), bus(es), combiner(s), device(s) and/or multiplexer(s). In some examples, data and/or electrical signals transported and/or exchanged within the ONT 108 are implemented and/or represented as Ethernet packets.

To communicatively couple the example devices 114-116 to the ONT 108, the example ONT 108 of FIG. 1 includes any number and/or type(s) of interfaces, two of which are designated at reference numerals 118 and 119. Example interfaces include, but are not limited to a network interface 118 implemented in accordance with any of the IEEE 802.x standards for Ethernet, a coaxial cable interface (not shown), and/or a plain old telephone service (POTS) interface 119 for communicatively coupling the example analog telephone 116 to a VoIP analog terminal adapter (ATA) 120. While the example devices 114-116 of FIG. 1 are depicted as being directly coupled to the example ONT 108, the devices 114-116 may, additionally or alternatively, be communicatively coupled to the ONT 108 via any number and/or type(s) of intervening networks and/or communication devices. For example, the example PC 114 and the STB 115 may be communicatively coupled to a local area network (LAN) that is communicatively coupled to the network interface 118 via, for example, a network switch, hub and/or router.

To provide telephone services, the example ONT 108 of FIG. 1 includes any number and/or type(s) of VoIP ATAs, one of which is designated at reference numeral 120. The example VoIP ATA 120 of FIG. 1 implements any number and/or type(s) of translations and/or interface functions to enable the example telephone 116 to access telephone services implemented and/or provided by a VoIP network (not shown). In some examples, one or more VoIP devices (not shown) may be communicatively coupled to the ONT 108 via a network interface, such as the example network interface 118. In such examples, the VoIP devices are coupled to the service provider network 104 via the distributor 112 and the O/E interface 110.

Traditional ONTs implement a fixed combination of integral interfaces regardless of which communication and/or data service(s) are subscribed to at a particular customer premises. As such, some interfaces may be unused, an insufficient number of a particular type of interface may be implemented for a particular customer premises, and/or an interface type requested and/or needed by a customer may not implemented by the ONT. In all such circumstances, revenue may be lost due to the cost of manufacturing unused interfaces, decreased customer satisfaction, and/or an inability to realize revenue for a requested service due to the unavailability of a particular type of interface. For example, some traditional ONTs implement an integral residential gateway (RG) to facilitate, for example, an IPTV service to a plurality of STBs. However, when a subscriber associated with a particular ONT only subscribes to voice and/or Internet access services, the devices and/or interfaces included in the ONT to implement the integral RG may be unused and represent a potentially wasted capital investment.

To implement a base and/or common set of integral interfaces, the example ONT 108 of FIG. 1 includes a base unit 128. The example base unit 128 of FIG. 1 integrates the set of network interfaces 118 and 119 that are commonly utilized by a large percentage of current and/or are anticipated to be utilized by a large percentage of potential customers. The example network interfaces 118 and 119 are integrated and, thus, not designed to be removable outside of a manufacturing environment. As such, the interfaces 118 and 119 integrated within the example base unit 128 are interfaces that will actually be used by a large percentage of customers and, thus, the risk of wasted capital investment to integrate them within each ONT 108 installed by a service provider is minimal. For example, as illustrated in FIG. 1, the base unit 128 provides the base and/or minimal set of integrated interfaces, devices and/or systems to provide triple-play services.

The example ONT 108 of FIG. 1 is designed, and/or assembled such that the example network interfaces 118, 119, the example distributor 112, the example VoIP ATA 120, the example base unit 128, and the example O/E interface 110 are an integral part of the ONT 108. As integral component(s) of the ONT 108, the example interfaces 110, 118 and 119, the example distributor 112, the example VOIP ATA 120, the example base unit 128, and the example O/E interface are not intended to be field insertable, removable and/or replaceable. That is the example network interfaces 118, 119 the example distributor 112, the example VOIP ATA 120, the example base unit 128, and the example O/E interface 110 are installed and/or affixed within the ONT 108 such that they may not be removed and/or replaced, while the ONT 108 is located at a customer premises 102, using tools and/or equipment common to a customer, installer and/or service technician.

To provide additional and/or alternative interfaces to those implemented by the example base unit 128, the example ONT 108 of FIG. 1 includes a module interface 130. The example module interface 130 of FIG. 1 allows any number and/or type(s) of field pluggable and/or insertable service and/or interface modules, four of which are designated at reference numerals 132, 133, 134 and 135, to be communicatively coupled to the example distributor 112. The example module interface 130 includes a plurality of bays, slots, and/or spaces, each having a connector (one of which is designated at reference numeral 138) into which any of the service modules 132-135 can be inserted and/or plugged while, for example, the ONT 108 is located at the example customer premises. The connector 138 of each bay, slot, and/or space electrically couples a corresponding one of the service modules 132-135 to the module interface 130 and, thus, to the distributor 112. While the example ONT 108 depicts an example installation including both the base unit 128 and the module interface 130, the example ONT 108 may be manufactured with only the base unit 128. In that case, if additional and/or alternative services are desired, the module interface 130 may be installed while the ONT 108 is located and/or installed at the customer premises 102. Example service modules include, but are not limited to, a wireless backup module 132, an A/V source module 133, a network interface module 134 and/or a RG module 135.

To identify and/or configure service modules 132-135 communicatively coupled to the example module interface 130, the example module interface 130 of FIG. 1 includes a configurer 140. The example configurer 140 of FIG. 1 detects which service modules 132-135 are installed, and initializes and/or configures the identified service modules 132-135. Example processes that may be executed to implement the example configurer 140 of FIG. 1 are described below in connection with FIGS. 2-4.

Occasionally, the connection between the service provider network 104 and the customer premises 102 via the optical distribution network 106 may not be operational due to any manner and/or type(s) of service disruptions, such as a fiber-optic cable break. To implement a wireless backup capability, the example wireless backup module 132 may be installed in the example ONT 108. When the example ONT 108 is currently not able to communicate with the service provider network 104 via the optical distribution network 106, the example wireless backup module 132 of FIG. 1 communicatively couples to the service provider network 104 via a wireless network 144. The wireless communication path formed via the example wireless backup module 132 and the example wireless network 144 serves as a temporary replacement for the optical distribution network 106 until the fault in the optical distribution network 106 is resolved. As such, a fault in the optical distribution network 106 does not cause the customer premises 102 to lose access to its subscribed services. However, because the data rate supported by the backup wireless module 132 may be lower than that supported by the O/E interface 110, not all services may be available via the backup wireless module 132. For example, IPTV services may be temporarily disabled while the example ONT 108 is communicatively coupled to the wireless network 144 via the optical distribution network 106 via the wireless network 144. In such circumstances, the ONT 108 may provide an indication that a backup mode has been activated and that some services are currently disabled. Additionally or alternatively, the ONT 108 can notify the service provider network 104 of the service interruption and/or outage via the wireless backup module 132. When the optical distribution network 106 is again functional, the transport of data between the ONT 108 and the service provider network 104 reverts to the optical distribution network 106, and any disabled services, such as the IPTV service, are re-enabled. In some examples, the ONT 108 notifies the service provider network 104 when services have been restored.

To provide access to locally generated A/V content, the example A/V source module 133 of FIG. 1 may be installed in the example ONT 108. Using any number and/or type(s) of method(s), algorithm(s), circuit(s) and/or device(s), the example A/V source module 133 converts audio and/or video content received via any number and/or type(s) of A/V devices, one of which is depicted at numeral 146 into a stream of IP packets that may be routed to other interfaces of the ONT 108, other devices communicatively coupled to the ONT 108, and/or to other customer premises via the service provider network 104.

To communicatively couple the A/V devices 146 to the example ONT 108, the example A/V source module 133 of FIG. 1 includes any number and/or type(s) of connectors such as, but not limited to, a Universal Service Bus (USB) compliant connector, an IEEE 1394 compliant connector, a digital visual interface (DVI) compatible connector and/or a high-definition multimedia interface (HDMI) compatible connector. In some examples, each connector implemented by the A/V source module 133 is assigned a unique IP address. An A/V device, such as the example AV device 146, is communicatively coupled to the A/V source module via the connector such that audio and/or video data received via a particular connector is converted to an IPTV compliant signal and associated with the IP address of the particular connector. The converted IPTV signal is routed and/or streamed to a network interface associated with the IPTV service, such as the interface 118. The customer may then choose to view and/or listen to the A/V signal by tuning the example STB 115 to the channel associated with the connector IP address.

To provide connectivity to additional network devices, the example network interface module 134 may be installed in the example ONT 108. The example network interface module 134 may be installed to communicatively couple, for example, an additional PC 147 and/or a VoIP telephone 148 to the ONT 108 via one or more network interfaces, one of which is depicted at numeral 150. The network interface module 134 may be implemented in accordance with, for example, any of the IEEE 802.x family of standards, or any Home Phone Networking Alliance (HPNA) specification, an IEEE 803.x based wireless interface, a coaxial cable interface, an Ethernet interface, and/or a data over power line interface.

To share one or more service(s) among two or more devices to, for example, share an IPTV service among a plurality of STBs, the example RG module 135 of FIG. 1 may be installed in the example ONT 108. The example RG module 135 of FIG. 1 implements a network address translation (NAT) module, a port address translation module (PAT), and/or a DHCP module to allow one or more device(s) within the customer premises 102, such as the example devices 114-116 and 146-148, to share a single public IP address. For example, the NAT module may obtain a local IP address from the DHCP module within the example RG module 135 and assign a port number to each example device 114-116 and/or 146-148. When the RG module 135 receives an IP packet from the example distribution network 106, the example RG module 135 examines the received port field of the IP packet to determine the local IP address associated with the port and routes the IP packet to the device associated with the local address.

While an example manner of implementing the example ONT 108 is illustrated in FIG. 1, one or more of the elements, blocks, and/or devices illustrated in FIG. 1 may be combined, divided, re-arranged, omitted, eliminated, and/or implemented in any other way. Further, the example O/E interface 110, the example distributor 112, the example VoIP ATA 120, the example wireless backup module 132, the example A/V source module 133, the example network interface module 134, the example RG module 135, the example configurer 140, the example module interface 140 and/or, more generally, the example base unit 128, and/or the ONT 108 of FIG. 1 may be implemented by hardware, software, firmware and/or any combination of hardware, software and/or firmware. Thus, for example, any or all of the example O/E interface 110, the distributor 112, the example VoIP ATA 120, the example wireless backup module 132, the example A/V source module 133, the example network interface module 134, the example RG module 135, the example configurer 140, the example module interface 140 and/or, more generally, the example base unit 128, and/or the example ONT 108 could be implemented by one or more circuit(s), programmable processor(s), application specific integrated circuit(s) (ASIC(s)), programmable logic device(s) (PLD(s)) and/or field programmable logic device(s) (FPLD(s)), discrete logic, hardware, firmware, etc. Further still, the ONT 108 of FIG. 1 may include one or more elements, processes and/or devices in addition to, or instead of, those illustrated in FIG. 1 and/or may include more than one of any or all of the illustrated elements, processes, and devices.

Figure 2:
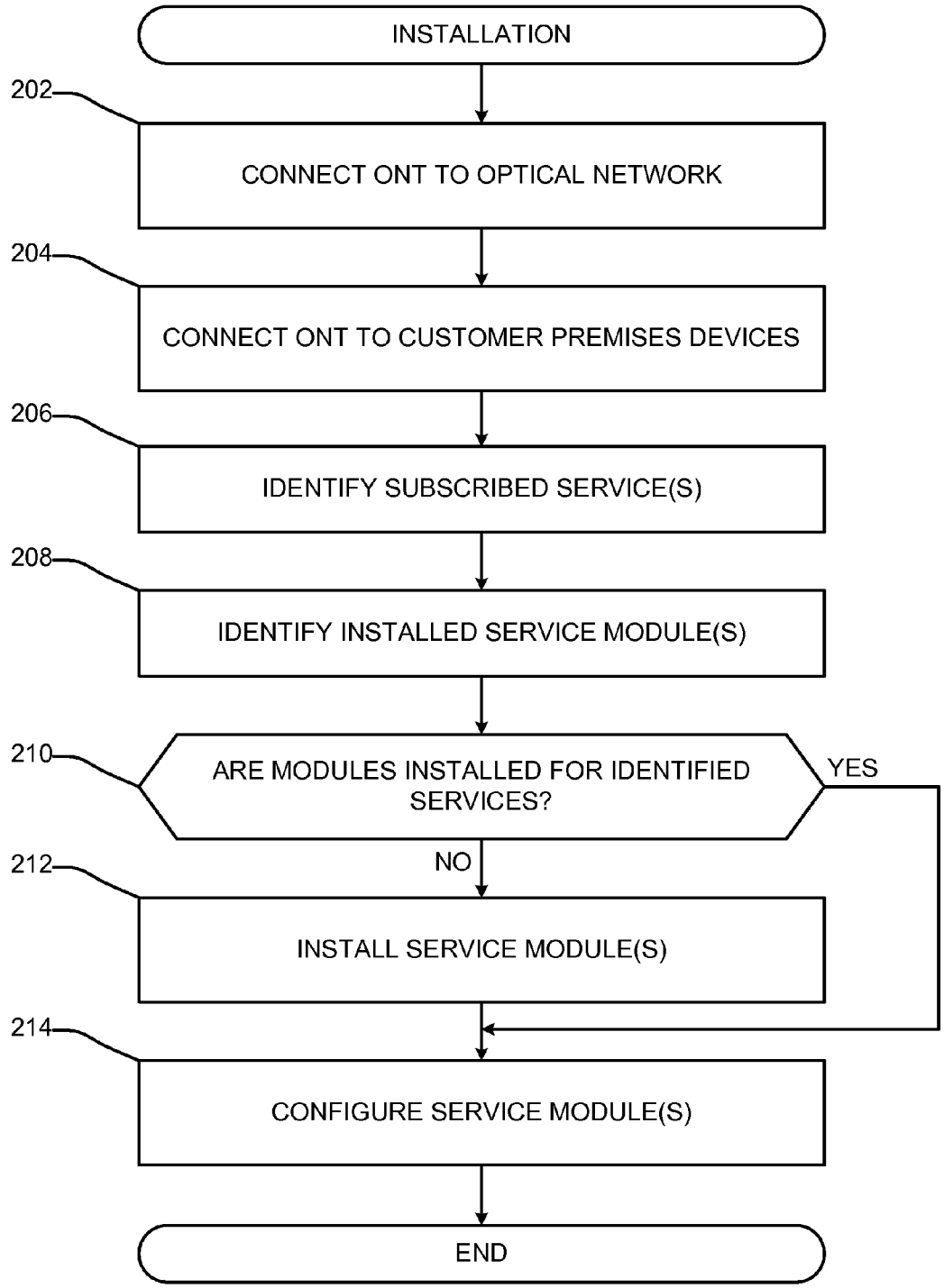
FIGS. 2-4 are flowcharts representative of example processes that may be carried out to install and configure the example modular ONT of FIG. 1.
Figure 3:
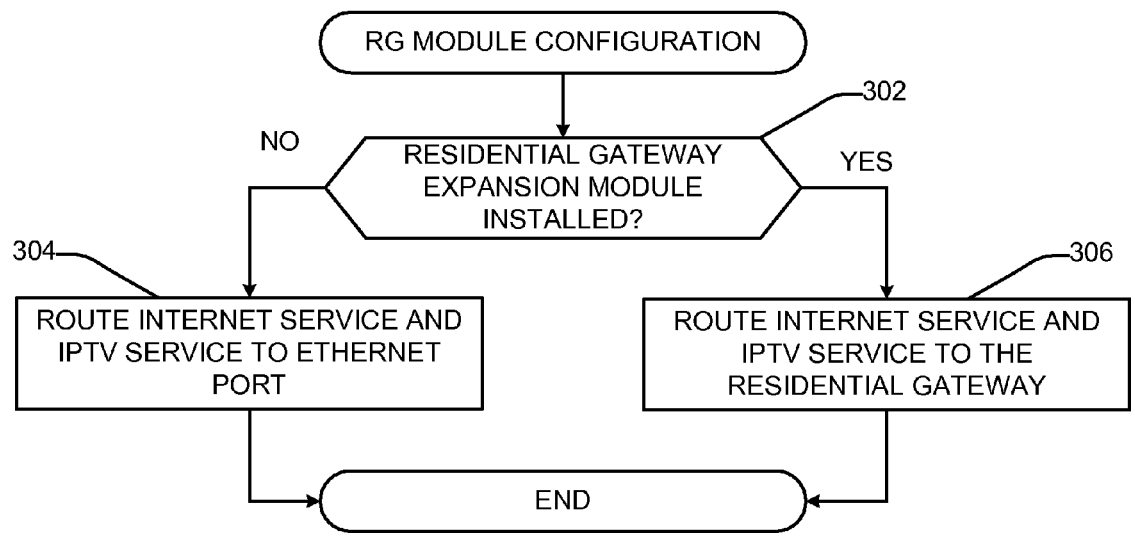
Figure 4:
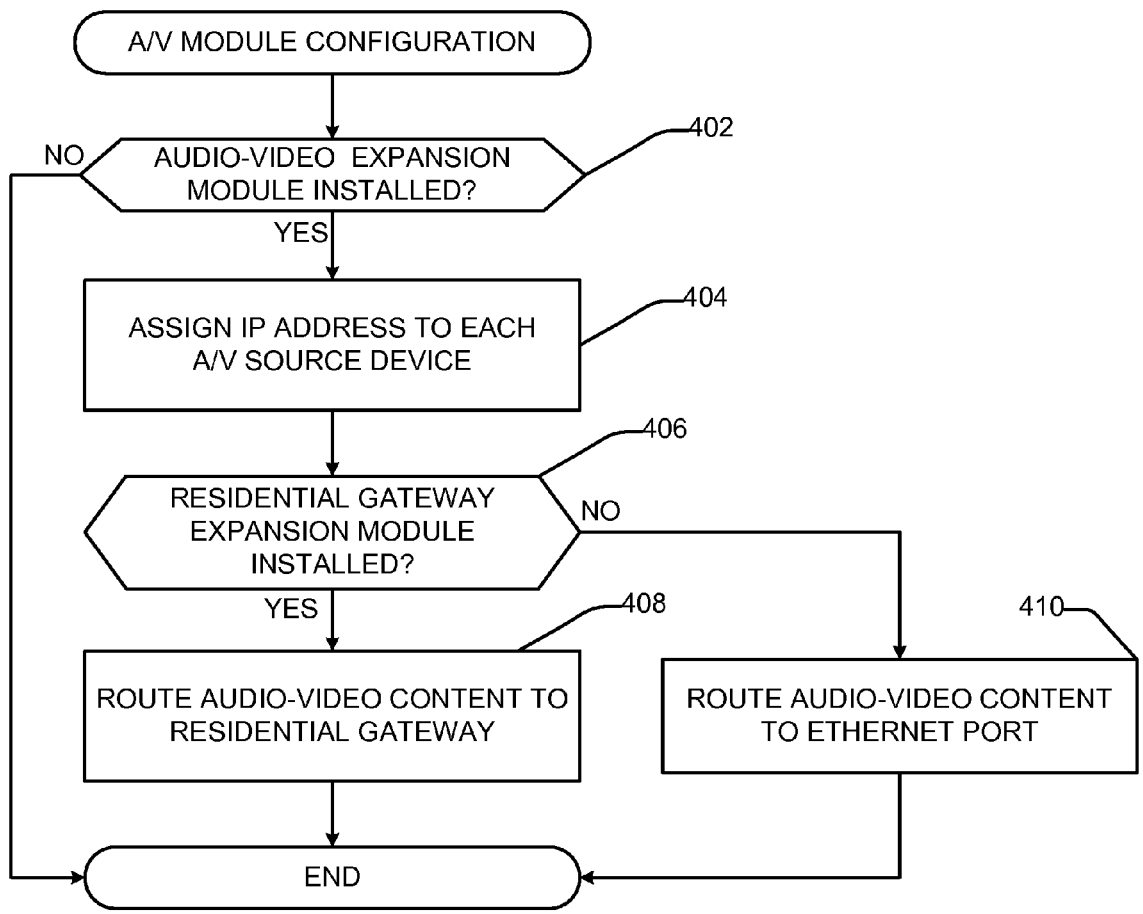
Figure 5:
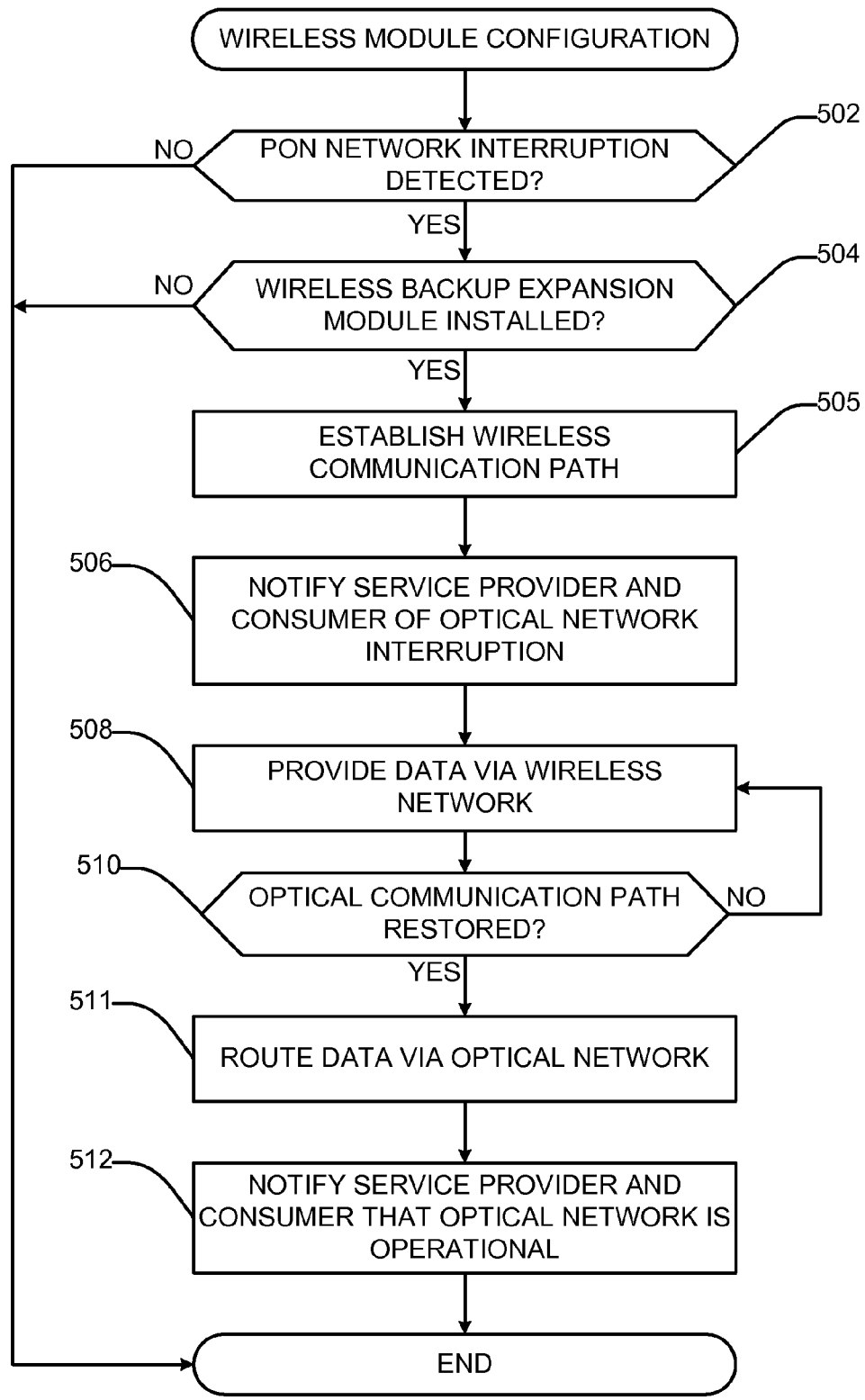
FIG. 5 is a flowchart representative of an example process that may be carried out to implement the example wireless backup module of FIG. 1.

FIGS. 2-4 are flowcharts representative of example processes that may be carried out to install and/or configure the example ONT 108 of FIG. 1. FIG. 5 is a flowchart representative of an example process that may be carried out to implement the example wireless backup module 132 of FIG. 1. The example processes of FIGS. 2-5 may be carried out by a processor, a controller, and/or any other suitable processing device. For example, the example processes of FIGS. 2-5 may be embodied in coded instructions stored on any tangible computer-readable medium such as a flash memory, a compact disc (CD), a digital versatile disc (DVD), a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other medium which can be used to carry or store program code and/or instructions in the form of machine-accessible and/or machine-readable instructions or data structures, and which can be accessed by a processor, a general-purpose or special-purpose computer, or other machine with a processor (e.g., the example processor platform P100 discussed below in connection with FIG. 6). Combinations of the above are also included within the scope of computer-readable media. Machine-accessible instructions comprise, for example, instructions and/or data that cause a processor, a general-purpose computer, special-purpose computer, or a special-purpose processing machine to implement one or more particular processes. Alternatively, some or all of the example processes of FIGS. 2-5 may be implemented using any combination(s) of ASIC(s), PLD(s), FPLD(s), discrete logic, hardware, firmware, etc. Also, some or all of the example processes of FIGS. 2-5 may instead be implemented manually or as any combination of any of the foregoing techniques, for example, any combination of firmware, software, discrete logic and/or hardware. Further, many other methods of implementing the example operations of FIGS. 2-5 may be employed. For example, the order of execution of the blocks may be changed, and/or one or more of the blocks described may be changed, eliminated, sub-divided, or combined. Additionally, any or all of the example processes of FIGS. 2-5 may be carried out sequentially and/or carried out in parallel by, for example, separate processing threads, processors, devices, discrete logic, circuits, etc.

The example process of FIG. 2 may be carried out to install the example ONT 108 of FIG. 1. The example process of FIG. 2 begins with connecting and/or communicatively coupling the example ONT 108 to the example optical distribution network 106 via the example O/E interface 110 (block 202). One or more customer premises devices, such as any of the example devices 114-116 and 146-148, are connected to the ONT 108 (block 204). The services that are subscribed to at the customer premises 102 are identified, either manually or electronically (block 206).

The number and/or type(s) of service modules 132-135 installed in the example ONT 108 are identified, either manually or electronically (block 208). For example a service technician installing the ONT 108 may usually examine the ONT 108 to identify the installed service modules 132-135, and/or the technician may use a computer to interact with the example configurer 140 to electronically identify the installed services modules 132-135. If any identified subscribed service does not have an associated integral interface 118,119 or an associated installed service module 132-135 (block 210), a corresponding service module 132-135 associated with the service is installed (block 212). For example, if a wireless backup service is identified by, for example, a service technician installing the example ONT 108, and the wireless backup module 132 is not already installed, the wireless backup module 132 is installed in the ONT 108. The configurer 140 configures the installed service modules 132-135 for the subscribed services (block 214). Control then exits from the example process of FIG. 2.

Returning to block 210, if the identified subscribed service has an associated integral interface 118,119 or an associated service module 132-135 communicatively coupled to the module interface 130 (block 210), control proceeds to block 214 without installing any service module.

The example process of FIG. 3 begins with the example configurer 140 determining whether the example RG module 135 is installed (block 302). If the RG module 135 is not installed (block 302), the configurer 140 configures the distributor 112 to route Internet access and/or IPTV service packets to the integral interface(s) 118,119 and/or the interface 150 based on the destination IP address(es) contained in received packets (block 304). Control then exits from the example process of FIG. 3.

If the RG module 135 is installed (block 302), the example configurer 140 configures the distributor 112 to route all IP packets to the RG module 135, which implements a NAT module and a DHCP module for the ONT 108 to allow the devices 114, 115, 146, 147, and 148 to share the same public IP address (block 306). The configurer 140, in turn, configures the RG module to route the IP packets to the devices 114, 115, 146, 147, and 148 based on the destination IP address(es) and port identifier(s) contained in the received packets. Control then exits from the example process of FIG. 3.

The example process of FIG. 4 begins with the example configurer 140 determining whether the example A/V source module 133 is installed (block 402). If the A/V source module 133 is not installed (block 402), control exits from the example process of FIG. 4.

If the A/V source module 133 is installed (block 402), the configurer 140 assigns a unique IP address to each A/V connector implemented by the A/V source module 133 (block 404). The configurer 140 determines whether the example RG module 135 is installed (block 406). If the RG module 135 is installed (block 406), the configurer 140 configures the distributor 112 to route all audio and/or video data from the A/V source module 133 to the RG module 135 (block 408). The configurer 140, in turn, configures the RG module to route all IP packets from the A/V source module 133 to the interface(s) 118,119 and/or 150 associated with the IPTV service. Control then exits from the example process of FIG. 4.

If the RG module 135 is not installed (block 406), the configurer 140 configures the distributor 112 to route the IP packets associated with the audio and/or video data from the A/V source module 133 to the interface(s) 118,119 and/or 150 associated with IPTV service (block 410). Control then exits from the example process of FIG. 4.

The example process of FIG. 5 begins with the example O/E interface 110 determining whether the ONT 108 is coupled to the service provider network 104 via the optical distribution network 106 (block 502). If there is a disruption of an optical signal (block 502), the configurer 140 determines whether the example wireless backup module 132 is installed (block 504).

If there is a wireless backup module 132 installed (block 504), the wireless backup module 132 establishes a communication path between the ONT 108 and the service provider network 104 via the wireless network 144 (block 505). The configurer 140 notifies the service provider network 104 of the service disruption via the wireless communication path (block 506) and configures the distributor 112 to use the wireless backup module 132 rather than the O/E interface 110 to exchange data with the service provider network 104 (block 508). In some examples, the configurer 140 disables high data-rate services, such as an IPTV service, while the ONT 108 is using the wireless backup module 132 to access the service provider network 104.

When the original optical communication path is restored (block 510), the configurer 140 configures the distributor 112 to revert to using the O/E interface 110 to exchange data with the service provider network 104 (block 511), and notifies the service provider network 104 that coupling via the optical distribution network 106 has been restored (block 512). Control then exits from the example process of FIG. 5.

Returning to block 504, if the wireless backup module 132 is not installed (block 504), control exits from the example process of FIG. 5 without establishing a backup communication path.

Returning to block 502, if no disruption to the optical communication path was detected (block 502), control exits from the example process of FIG. 5.

Figure 6:
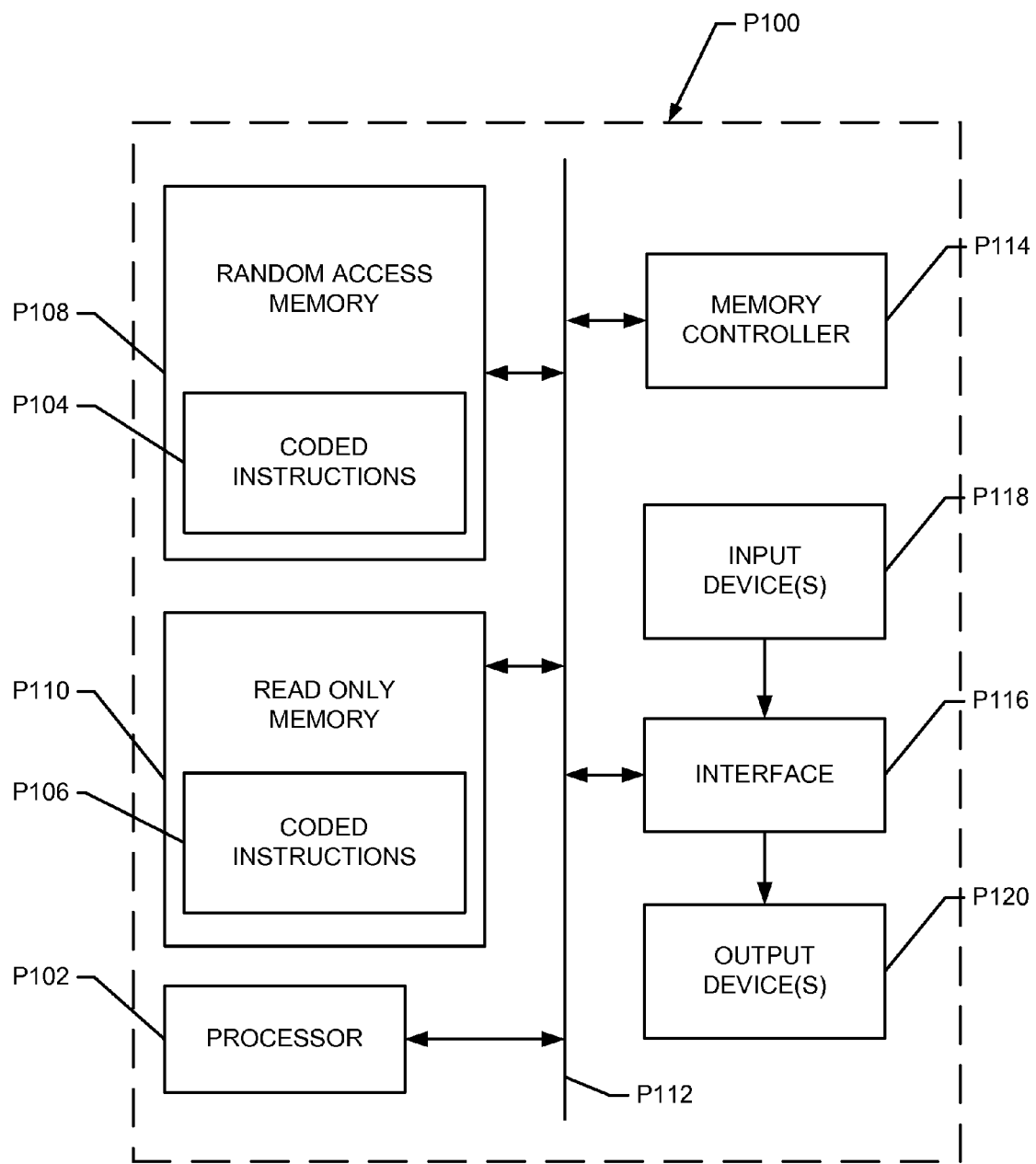
FIG. 6 is a block diagram of an example processor system that may be used to execute the example process of FIGS. 2-5, and/or to implement any of the example methods and apparatus disclosed herein.

FIG. 6 is a schematic diagram of an example processor platform P100 that may be used and/or programmed to implement all or a portion of any or all of the example processes of FIGS. 2-5. One or more general-purpose processors, microcontrollers, etc. can implement the example processor platform P100. The example processor platform P100 or a platform similar thereto, may be used to implement the example wireless backup module 132, the example configurer 140, and/or the example distributor 112.

The processor platform P100 of the example of FIG. 6 includes at least one general-purpose or special-purpose programmable processor P102. The processor P102 executes machine-accessible instructions P104 and/or P106 present in, for example, a main memory of the processor P102 (e.g., within a RAM P108 and/or a ROM P110). The processor P102 may be any type of processing unit, such as a processor or a microcontroller. The processor P102 may implement, among other things, the example processes of FIGS. 2-5.

The processor P102 is in communication with the main memory (including a RAM P108 and/or a ROM P110) via a bus P112. The RAM P108 may be implemented by dynamic random-access memory (DRAM), synchronous dynamic random-access memory (SDRAM), and/or any other type of RAM device, and the ROM P110 may be implemented by flash memory and/or any other desired type(s) of memory device(s).

The processor platform P102 also includes an interface circuit P116. The interface circuit P116 may implement any number and/or type(s) of interface standard, such as an external memory interface, a serial network interface, a general purpose input/output, etc. One or more input devices P118 and one or more output devices P120 are connected to the interface circuit P116. The example devices P118 and P120 may be used to implement the example network interfaces 118 and 119, the example O/E interface 110, the example module interface 130, the VoIP ATA 120, and/or the example service modules 132-135.

Although certain example methods, apparatus, and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. An optical network terminal comprising:
    a base unit having:
        an integral optical interface to optically couple the optical network terminal to an optical network in communication with a service provider network and to convert an optical signal received from the optical network to a first electrical signals signal, the optical signal associated with a first service having a first data rate and a second service having a second data rate; and
        an integral network interface to distribute the first electrical signal within a customer premises to provide the first and second services to the customer premises; and
        a modular interface to configure a plug-in service module to cause the service provider network to provide the first and second services to the optical network terminal via a wireless network, the modular interface to receive the plug in service module and to communicatively couple the integral network interface of the base unit to the plug in service module in response to a disruption of the optical signal being detected, the modular interface to enable the plug-in service module to continue to provide the first service when the first data rate is below a threshold value, and to disable the second service when the second data rate is above the threshold value.

2. An optical network terminal as defined in claim 1, wherein the first electrical signal is associated with at least one of an Internet access service, a voice over Internet protocol service, or an Internet protocol television service.

3. An optical network terminal as defined in claim 1, wherein the integral optical interface is affixed within the optical network terminal such that the integral optical interface is not intended for at least one of installation in and removal from the optical network terminal outside of a manufacturing environment.

4. An optical network terminal as defined in claim 1, wherein the modular interface comprises an insertable module.

5. An optical network terminal as defined in claim 1, wherein the plug-in service module is a first plug-in service module, and the modular interface is further to configure a second plug-in service module to distribute a second electrical signal within the customer premises to provide a third service identified as not being associated with the integral network interface, the modular interface to receive the second plug-in service module and to communicatively couple the second electrical signal from the base unit to the second plug-in service module.

6. An optical network terminal as defined in claim 1, wherein the modular interface is to provide a notification of the disruption of the optical signal to the service provider network via the wireless network.

7. An optical network terminal as defined in claim 1, wherein the modular interface is to provide a notification of a restoration of the optical signal to the service provider network when the first service is provided via the optical signal.

8. An optical network terminal as defined in claim 7, wherein the second service is disabled based on a data rate supported by the plug-in service module.

9. An optical network terminal as defined in claim 1, wherein the modular interface is to provide an indication that the wireless backup service is activated to the customer premises.

10. An optical network terminal as defined in claim 5, wherein the second plug-in service module comprises at least one of a wired network interface, a wireless interface, a data over telephone wire network interface, or a data over power line network interface.

11. An optical network terminal as defined in claim 5, wherein the second plug-in service module is to enable the optical network terminal to provide a communication service to the customer premises.

12. An optical network terminal as defined in claim 5, wherein the second plug-in service module is to enable a voice over Internet protocol service.

13. An optical network terminal as defined in claim 5, wherein the second plug-in service module is to enable an Internet access service.

14. An optical network terminal as defined in claim 5, wherein the second plug-in service module is to enable sharing a service between a plurality of devices.

15. An optical network terminal as defined in claim 5, wherein the second plug-in service module is to enable a local audio-video conversion service.

16. An optical network terminal as defined in claim 9, wherein the indication indicates that the first service is available, but the second service provided via the optical signal has been disabled.

17. An optical network terminal comprising:
a first interface circuit to optically couple the optical network terminal to an optical network in communication with a service provider network and to convert an optical signal received from the optical network to a first electrical signal, the optical signal associated with a first service having a first data rate and a second service having a second data rate; and
a second interface circuit to distribute the first electrical signal within a customer premises to provide the first and second services to the customer premises; and
a third interface circuit to: receive a plug-in device; and communicatively couple the second interface circuit to the plug-in device in response to a disruption of the optical signal being detected to enable the plug-in device to continue to provide the first service to the customer premises via the second interface circuit when the first data rate is below a threshold value by exchanging data with the service provider network via a wireless network and to disable the second service to the customer premises via the second interface circuit when the second data rate exceeds the threshold value.

* * * * *